United States Patent [19]
Motzer
[11] Patent Number: 4,473,095
[45] Date of Patent: Sep. 25, 1984

[54] HYDRAULIC VALVE

[75] Inventor: Helmut Motzer, Leinfeld-Echterdingen, Fed. Rep. of Germany

[73] Assignee: Herion-Werke KG, Fellbach, Fed. Rep. of Germany

[21] Appl. No.: 347,173

[22] Filed: Feb. 9, 1982

[30] Foreign Application Priority Data

Feb. 12, 1981 [DE] Fed. Rep. of Germany ....... 3104957

[51] Int. Cl.³ .............................................. F16K 11/00
[52] U.S. Cl. .......................... 137/596.16; 137/596.18; 91/448
[58] Field of Search ...................... 137/596.16, 596.18, 137/596.14, 596.1, 596.0; 91/424, 448

[56] References Cited

U.S. PATENT DOCUMENTS

| | | | |
|---|---|---|---|
| 3,139,109 | 6/1964 | Ruchser | 137/596.16 |
| 3,874,405 | 4/1975 | Thayer | 137/596.16 |
| 4,353,392 | 10/1982 | Ruchser et al. | 91/424 |

FOREIGN PATENT DOCUMENTS

| | | | |
|---|---|---|---|
| 920334 | 10/1954 | Fed. Rep. of Germany | 137/596.18 |
| 1067273 | 2/1957 | Fed. Rep. of Germany | 137/596.16 |
| 2038615 | 11/1971 | Fed. Rep. of Germany | 137/596.16 |
| 2732773 | 2/1979 | Fed. Rep. of Germany | 137/596.16 |

*Primary Examiner*—Samuel Scott
*Assistant Examiner*—Noah P. Kamen
*Attorney, Agent, or Firm*—Peter K. Kontler

[57] ABSTRACT

A hydraulic safety valve for a press has two coaxially movable asymmetric pistons which, in the event of valve malfunction, block communication between the pump port and the working-fluid port while establishing communication between the working-fluid port and the reservoir port. In this position, the two pistons are hydraulically blocked against further movement and this blockage can be removed, and the valve returned to operative condition, only by removing fluid pressure at the pump port.

18 Claims, 4 Drawing Figures

HYDRAULIC VALVE

BACKGROUND OF THE INVENTION

The present invention relates to a valve.

More specifically, the invention relates to a hydraulic valve.

Still more particularly, the present invention relates to a hydraulic safety valve which is particularly—although not exclusively—suited for controlling safety functions in presses.

Valves of this type, when used on mechanical presses, are employed e.g. to control the brake and coupling of the press so that, should a press malfunction occur, the press cannot operate in an uncontrolled manner and cause a hazard to operating personnel. For safety reasons, this type of valve has two distinct control sections so that, in the event of malfunction of one of the sections, the other section will still assure proper braking of the press. The operation of the two sections is cyclically monitored by electrical circuits which, when they determine that one of the sections has malfunctioned, shut down the press since the valve then no longer provides the required safety redundancy.

A problem with this prior art approach is that the required electrical circuitry is quite complicated and, hence, rather expensive. Moreover, such circuitry is itself liable to malfunction which may pose safety hazards or at least disadvantageously influence the operation of the press.

SUMMARY OF THE INVENTION

Accordingly, it is an object of the present invention to overcome the disadvantages of the prior art.

A more particular object of the invention is to provide an improved safety valve—especially well-suited for use with mechanical presses—which avoids these disadvantages.

A still more specific object of the invention is to provide a safety valve of the type under discussion which is self-monitoring and does not require the use of electrical circuits for this purpose.

A concomitant object is to provide a valve of this type which is relative simple in its construction and therefore comparatively inexpensive to produce.

Yet a further object of the invention is to provide a hydraulic safety valve for mechanical presses and the like which is highly reliable in operation.

In keeping with these objects, and with still others which will become apparent hereafter, one aspect of the invention resides in a valve, particularly a safety valve for a press, which—briefly stated—may comprise a housing having a bore, fluid passage means communicating with the bore, and a pair of asymmetrically configurated fluid-controlling pistons in the bore and movable therein towards and away from one another. In addition to the general asymmetry of the pistons, the invention provides for one of the pistons to include a main body and one fluid-controlling section whereas the other piston has a main body and two axially spaced fluid-controlling sections.

The novel features which are considered as characteristic of the invention are set forth in particular in the appended claims. The improved valve itself, however, together with its construction and mode of operation, as well as additional features and advantages thereof, will be best understood upon a perusal of the following detailed description of specific although purely exemplary embodiments with reference to the accompanying drawing.

DESCRIPTION OF PREFERRED EMBODIMENTS

Figure 1:
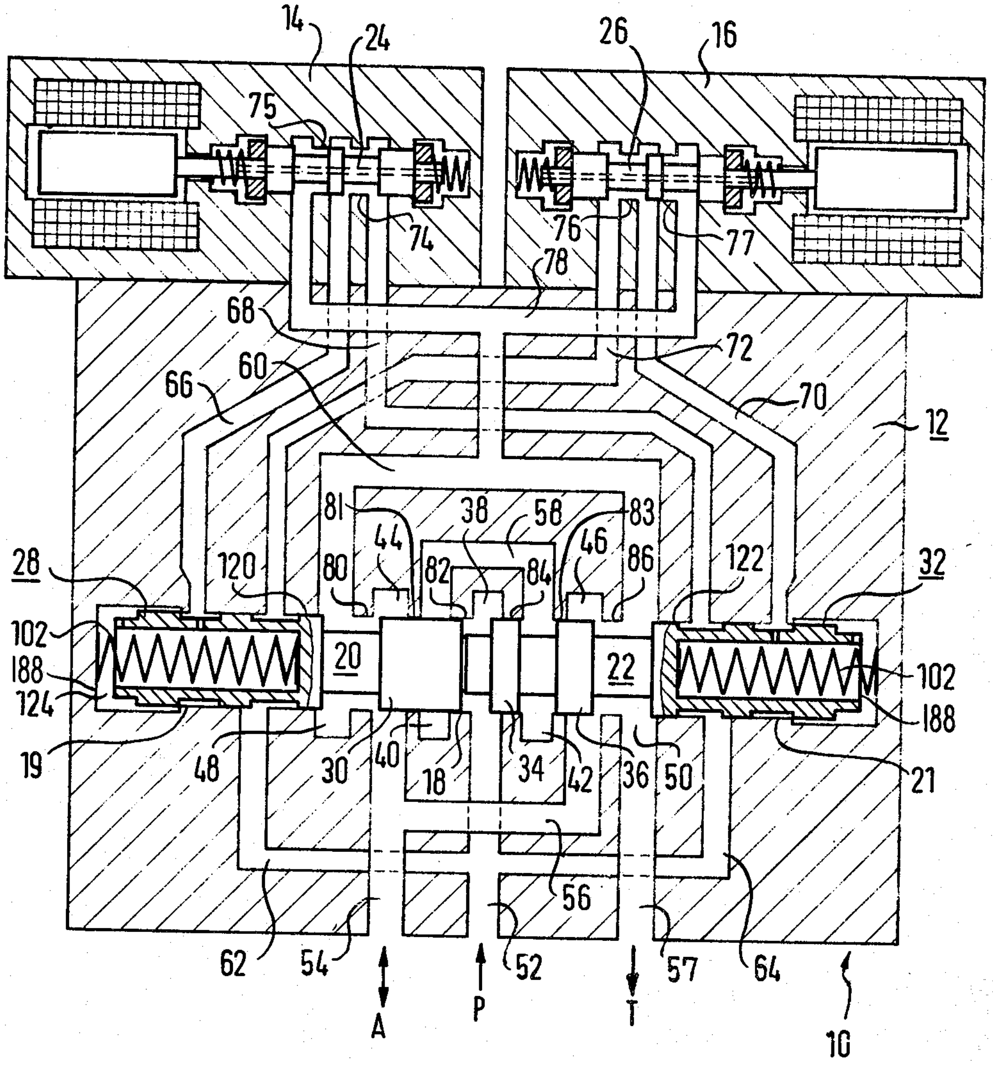
FIG. 1 is a sectional view illustrating the inventive valve in rest or neutral position.

Referring now to the drawing, and firstly to FIG. 1 thereof, it will be seen that the safety valve 10 according to the invention has a housing 12 to which two control valves 14, 16 are suitably secured (e.g. by means of non-illustrated flanges or the like). In the illustrated embodiment, these control valves 14, 16 are electromagnetically operable; however, other types of control valves could be used. Housing 12 has a central bore 18, 19, 21 formed therein. Received in axial alignment in this bore, and movable towards and away from one another therein, are two fluid-controlling pistons 20 and 22. Auxiliary pistons 24 and 26 are provided in the respective control valves 14 and 16.

According to the invention, the pistons 20, 22 are of asymmetrical configuration. More specifically, the piston 20 has a main body 28 and a fluid-controlling section 30 whereas the other piston 22 has a main body 32 and two fluid-controlling sections 34, 36 which are spaced from one another axially of the elongation of piston 22 (and of the bore 18, 19, 21). Annular passages or channels 38, 40, 42, 44, 46 and 48 are formed in the housing 12 and surround the bore portion 18. The passages 40 and 42 are in communication with one another via an overflow channel 58.

Also provided in the housing 12 are a working-fluid port A, a pump port P and a tank or reservoir port T. Pump port P communicates with annular passage 38 via a channel 52 whereas working-fluid port A is similarly in communication with annular passages 44 and 46 via channels 54 and 56, respectively. Reservoir port T communicates with an annular passage 50 via a channel 57 and annular which passages 50, in turn, communicates via an overflow channel 60 with annular passage 48.

The annular passage 38 is the middle or central one of the annular passages mentioned hereinbefore; all the others are arranged substantially symmetrically with reference to it. Thus, the annular passages 40 and 42 are located immediately next to the passage 38, one on each side thereof. They are, in turn, flanked (in axially outward direction of the bore portion 18) by the annular passages 44, 46 which communicate with working-fluid port A and those, in turn, are flanked axially outwardly by the annular passages 48 and 50 which communicate with the reservoir port T. In addition, the pump port P communicates via passages 62 and 64 with the respective bore portions 19 and 21 which contain the main piston bodies 28 and 32, respectively, of the fluid-controlling pistons 20 and 22.

The two control valves 14 and 16 communicate with the main valve 10 via channels 66, 68 and 70, 72, respectively, and also via a connecting channel 78 which connects the control valves 14, 16 with one another and with the overflow channel 60 in valve 10. Control valve 14 has two valve seats 74, 75 which are alternately opened and closed by the auxiliary piston 24, and corresponding valve seats 76, 77 (cooperating with auxiliary piston 26) are provided in control valve 16. The channel 66 extends from bore portion 19 of valve 10 to the control valve 14 with which it communicates behind (i.e. past) the valve seat 74, as considered in the direction of fluid flow. The passage 68, on the other hand, extends from the bore portion 21 of the valve 10 to the valve 14 and communicates with the latter ahead of the valve seat 74, again as considered in the direction of fluid flow. Similarly, as far as the control valve 16 is concerned, passage 70 extends from bore portion 21 of valve 10 to the valve 16 and communicates with the same behind the valve seat 76, as considered in the direction of fluid flow, while passage 72 extends from bore portion 19 to the valve 16 with which it communicates ahead of the valve seat 76, as considered in the direction of fluid flow. Channel 78 communicates, as already mentioned, with the passage 60 and with both control valve 14, 16; since passage 60, in turn, communicates with the reservoir port T, this serves to return fluid to the reservoir.

The housing 12 of valve 10 is provided, in the area of the bore portion 18, with valve seats 80, 81, 82, 83, 84 and 86. Of these, the valve seats 80, 81 and 82 cooperate with the control section 30 of the piston 20 while the valve seat 84 cooperate with the control section 34 and the valve seat 83, 86 cooperate with the control section 36 of the piston 22.

Main body 28 of piston 20 is provided in its outer circumference with a pair of axially spaced annular grooves 88 and 90 (see FIG. 4); similar annular grooves 92 and 94 (see FIG. 4) are provided in the outer circumference of the main body 32 of piston 22. Each of the main bodies 28 and 32 has a blind axial bore 100 (see FIGS. 3 and 4) and the axial bores 100 communicate via respective throttle bores 96 and 98 (see FIG. 4) with the annular grooves 90 and 94 of main bodies 28 and 32, respectively. Each blind bore 100 accommodates an expansion-type pressure spring 102; these springs permanently urge the two pistons 20 and 22 into the base or neutral position shown in FIG. 1 in which the working-fluid port A communicates with the reservoir port T.

The portions 104, 106 and 108 (see FIG. 3) of main body 28, and the portions 110, 112 and 116 (see FIG. 3) of main body 32, serve to perform fluid-flow control functions. The portions 106, 108 cooperate with the channels 66 and 72 and the portions 112, 116 cooperate with the channels 68, 70 and with the passage 64. Portion 104 cooperates with a valve seat 120 (see FIGS. 1 and 3) formed in the housing 12 and portion 110 cooperates with a similar valve seat 112 (see FIGS. 1 and 3) of the housing. Portions 108 and 116 cooperate with lands (i.e. control edges) 132 (see FIGS. 3 and 4) formed in the housing 12.

THE OPERATION

The base or neutral position of the inventive valve is illustrated in FIG. 1. In this position, the two pistons 20 and 22 are in their middle positions in which fluid flows from the working-fluid port A via channels 54, 60 and 56 directly to the reservoir port T. Valve seats 80 and 86 are open (unblocked) while valve seats 81, 82, 83 and 84 are closed (blocked). Valve seats 120 and 122 are also closed while the valve seats 74 and 76 of control valves 14 and 16 are open.

Thus, in the neutral position of FIG. 1, there is a connection from pump port P via channels 62, 64 annular grooves 88, 92, channels 72, 68, valve seats 74, 76 and channels 66, 70 to the annular grooves 90 and 94 of the respective pistons 20 and 22. In this position, the control portions 108 and 116 are in blocking relationship with the lands 132 so that the blind bores 100 accommodating the springs 102 communicate with the annular grooves 90 and 94, respectively, only via the throttle bores 96 and 98. In this position, the pistons 20 and 22 are pressure-equalized and are maintained in their central positions by the springs 102.

The axially outer ends of the bore portions 19 and 21 communicate with respective chambers 124 and 126 (see FIGS. 1, 3 and 4) which are formed in the housing 12 and which have a diameter that is larger than the outer diameter of the main bodies 28 and 32 so that pressurized fluid can flow between the outer walls of the main bodies 28, 32 and the inner walls bounding these chambers 124 and 126. The axially outer ends of the main bodies 28, 32 are provided with respective recesses 188 (see FIG. 1) of sufficient size to permit pressure fluid to enter unhindered from chambers 124, 126 into the blind bores 100 to pressurize the pistons 20, 22.

Figure 2:
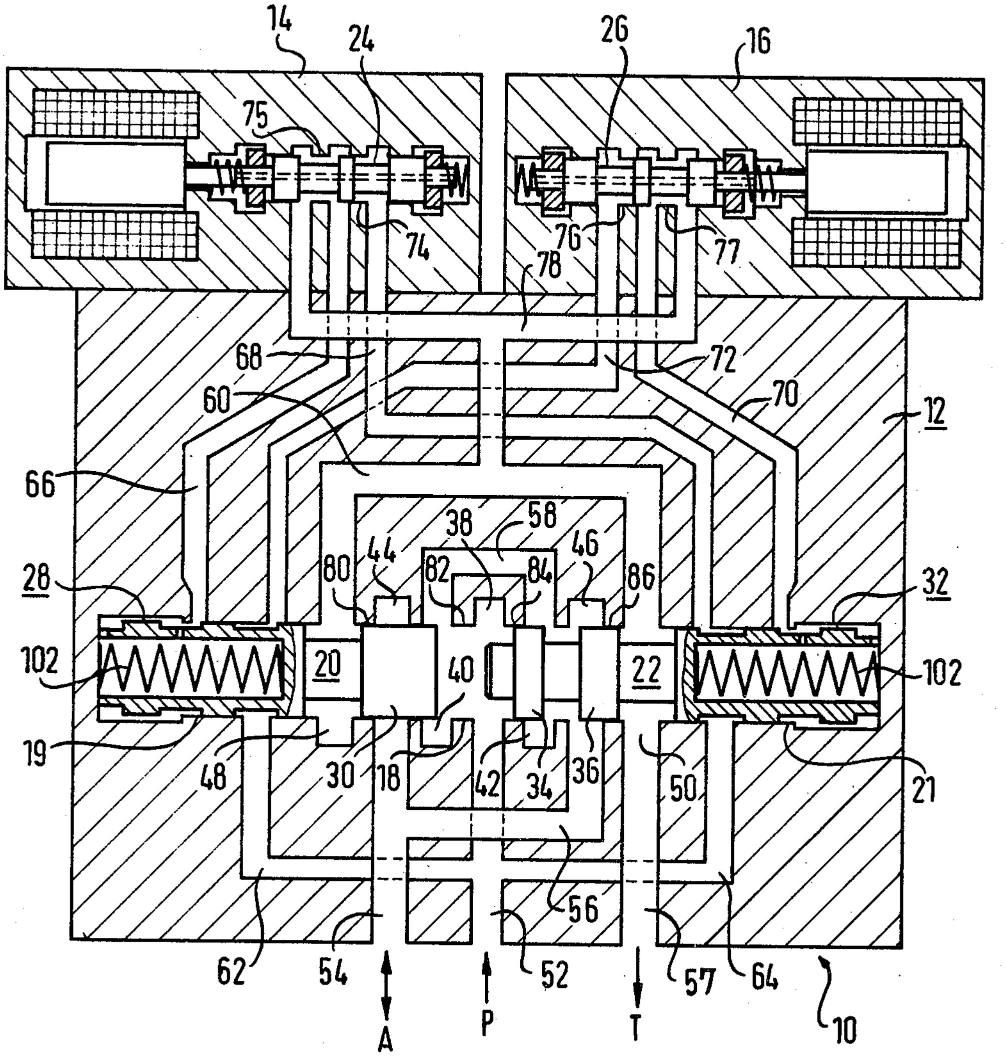
FIG. 2 is the same sectional view as in FIG. 1 but showing the valve in working position.

The working position of the inventive valve is shown in FIG. 2. To arrive at this position, the electromagnets (no reference numerals) of the control valves 14, 16 are operated to block the valve seats 74, 76 with the auxiliary pistons 24, 26. This causes the chambers 124, 126 (and thereby the pistons 20, 22) to be relieved of fluid pressure to the reservoir port T via the channels 66, 70, the now open valve seats 75, 77 of the control valves 14, 16, the channel 78, and the channels 60 and 50. The pressure of fluid in the annular passage 38 causes the two pistons 20, 22 to be shifted apart from one another, counter to the force exerted by their respective springs 102, until they assume the positions shown in FIG. 2 in which the pressure fluid flows from port P via the channel 52 and the annular passage 38 into the central bore portion 18. From there, the fluid flows via the now open valve seat 82 and the channel 58, and via the open valve seat 83, to the channel 56 and from there to the working-fluid port A. In this position, the valve seats 80, 84 and 86, as well as the valve seats 120 and 122, are all blocked.

As pointed out before, the inventive valve is a safety valve which is to provide protection against danger in the event of malfunction. How it does so is shown in FIGS. 3 and 4, each of which shows a possible malfunctioning condition.

Figure 3:
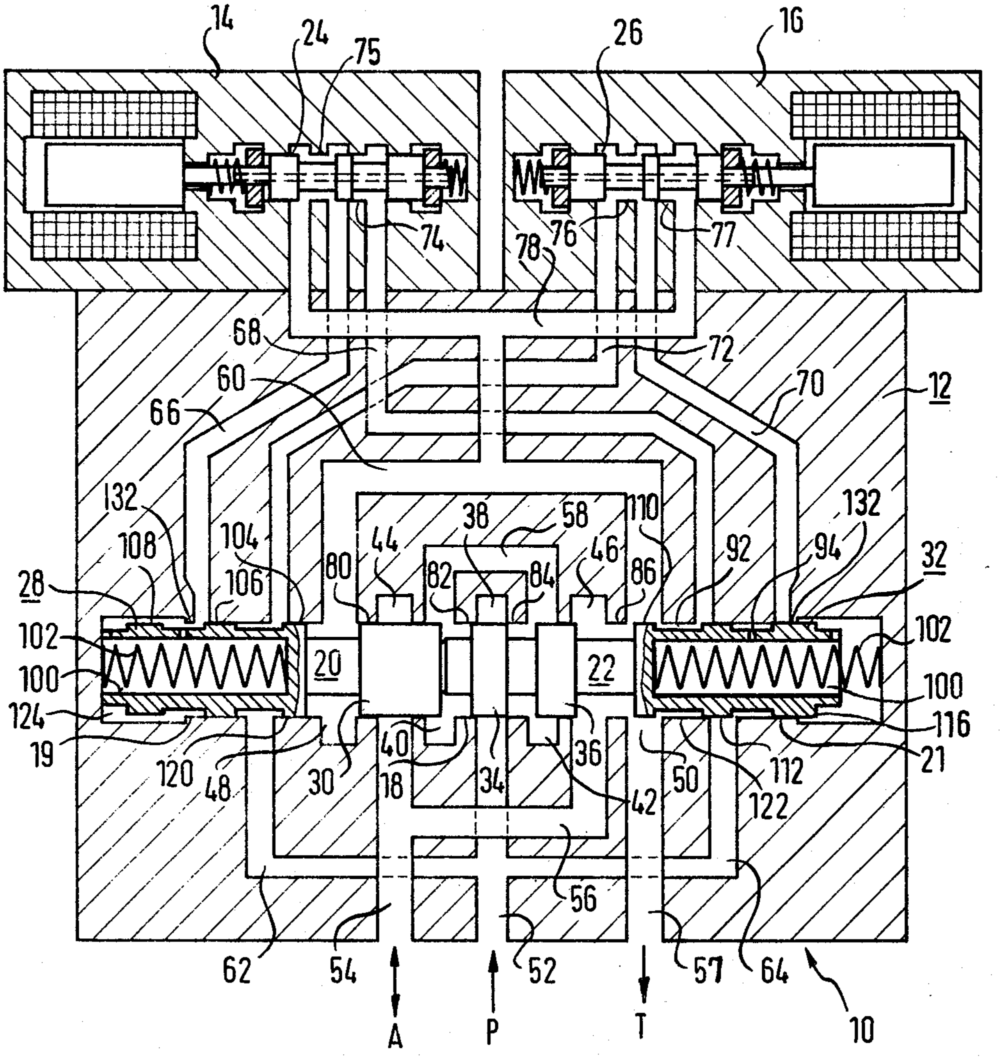
FIG. 3 is again the same sectional view as in FIG. 1 but showing the valve in manfunctioning position.
Figure 4:
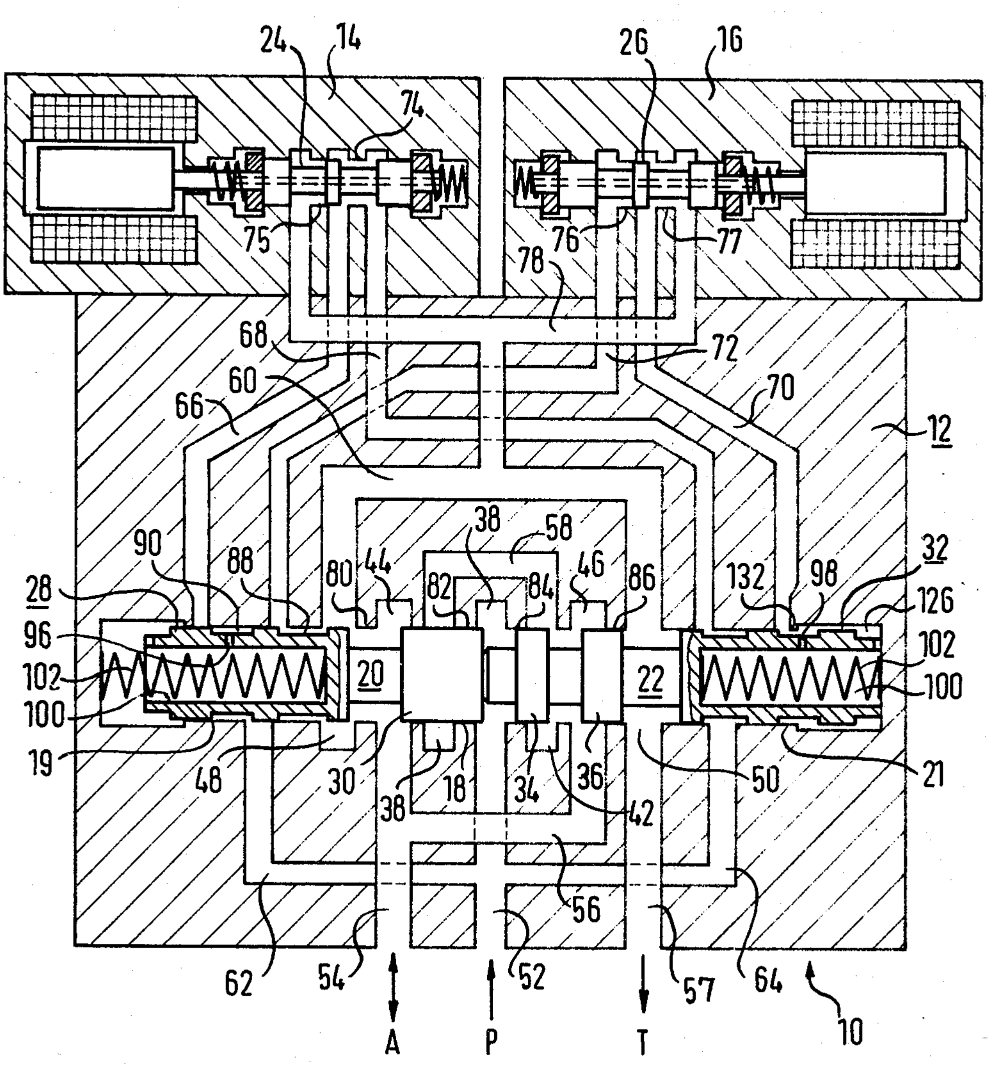
FIG. 4 is a view analogous to FIG. 3 but showing the valve in a different malfunctioning position.

The condition in FIG. 3 may result e.g. from the piston 20 being blocked against movement as the valve switches from the FIG. 2 position to the FIG. 1 position. This may happen for a variety of reasons such as, for example, failure of the control valve 14 to open or failure of the piston 22 to move to the FIG. 2 position in the first place during the initial switching of valve 10 from the FIG. 1 to the FIG. 2 position, e.g. because the control valve 16 malfunctioned and did not close.

In either instance, the piston 22 will move past the center position (FIG. 1). Once the pistons 20, 22 are in the relative position shown in FIG. 3, the working-fluid port A is connected with the reservoir port T via the channel 56 and the open valve seat 86. There is no connection whatever, in this position, between the pump port P and the working-fluid port A or between the pump port P and the reservoir port T.

Pump port P communicates through the throttle bore 98 with the longitudinal bore 100 of main body 32 via channel 64 and the annular groove 94; the main body 32 is thus subjected to the full pressure of incoming fluid, as well as to the biasing force of its spring 102, which both urge it to move leftwardly. Channel 70 is blocked by control section 116 and the control valve 14 is completely relieved of fluid pressure due to communication of reservoir port T with the channel 68 via the annular groove 92 of main body 32.

When the valve 10 assumes this position, it is hydraulically blocked. A change of control valve 14 to its other position will not influence the valve 10 under these circumstances since neither of the channels 66, 68 leading from it is, at this time, in communication with the pump port P. The same is true of any positional change of control valve 16 since channel 70 is blocked by the control section 116 and the main body 32 is subjected to the full pressure of pumped fluid via channel 64, annular groove 94 and throttle bore 98. The only way in which valve 10 can be returned to functioning condition in which the two pistons 20 and 22 are in the center positions shown in FIG. 1 is to relieve them of pressure. When the pump pressure at port P is relieved (i.e. when the pump is temporarily shut down), the pistons will return to their FIG. 1 center or rest positions under the influence of their springs 102.

It will be understood, in normal operation (i.e. when no malfunction is taking place), the pistons 20 and 22 move smoothly between the positions shown in FIGS. 1 and 2. If, however, a malfunction occurs and piston 22 moves left past the center position shown in FIG. 1 to the position of FIG. 3, then the channel 70 becomes blocked by the control section 116 and, at the same time, the control section 112 establishes communication between the channel 64 and the annular groove 94. The control section 110 establishes communication between reservoir port T and the annular groove 92.

As soon as the channel 70 becomes blocked, pressure fluid can pass from port P to the main body 32 only via the throttle bore 98 through which it enters the longitudinal bore 100 of main body 32. Since the throttle bore 98 greatly restricts this inflow of fluid, the leftward movement of the piston 22 slows down and the piston 22 will engage the piston 20 in a damped mode, i.e. gently. This damping effect begins as soon as the control section 116 moves past the land 132 thus forcing the pressure fluid to flow into bore 100 via throttle bore 98 of main body 32.

Assuming that the valve switching signal for the piston 22 arrives with delay (i.e. a malfunction occurs) whereas piston 20 performs its normal and timely movement from the position of FIG. 1 to the position of FIG. 2, then the piston 22 will slowly move left to its malfunction position (FIG. 3); if, however, the switching signal for the piston still 22 arrives before the control section 116 has blocked the channel 70, then the channel 70 will be relieved to the reservoir port T and the piston 22 will, at this time, still assume the operating position shown in FIG. 2 rather than the malfunction position of FIG. 3. This is due to the fact that, at this time, the chamber 126 is pressure-relieved and the piston 22 is subjected to the full pump pressure acting in the bore portion 18 which serves to force it to the FIG. 2 working position counter to the urging of its spring 102.

On the other hand, should the switching signal for piston 20 arrive late (i.e. the signal which controls movement of the piston 20 from the working position in FIG. 2 back to the rest position of FIG. 1), then the piston 22 will rapidly move to the center position (compare FIG. 1) in which the valve seat 84 is closed and the valve seat 86 is open. In this position, the working-fluid port A is connected with the reservoir port T via channel 56 and valve seat 86 but the connection between port P and port A is blocked. For the reasons explained above, the further movement of the piston 22 beyond this center position is slowed down, i.e. damped, so that—should the signal for piston 20 still arrive, albeit somewhat late but before the piston 22 has reached its malfunction position—the piston 20 will still, at this time, be able to move to the FIG. 1 position so that the valve remains operational.

Another malfunction possibility is shown in FIG. 4 in which the piston 22 has not returned from the FIG. 2 position to the FIG. 1 position or in which the piston 20 has not moved from the FIG. 1 position to the FIG. 2 position, whichever the case may be.

In this instance, the working-fluid port A is relieved to the reservoir port T via channel 54, the open valve seat 80, and channel 60, passage 50 and channel 57. Valve seat 84 is blocked by the control section 34, which means that communication between ports P and A is interrupted. Communication between channel 64 and port T is blocked by the control section 110 of main body 32, and communication between channels 62 and 60 is blocked by the control section 106 of main body 28. Valve seat 120 is open and establishes communication between the port T and the control valve 16 via channel 60, annular groove 88 and channel 72.

In this, as in the malfunction condition of FIG. 3, the inventive safety valve is hydraulically blocked and can be returned to its rest position (FIG. 1) only by removing fluid pressure at port P. Switching of the valve 16 from its one to its other position will not influence the valve 10 since both of the channels 70, 72 leading from control valve 16 are relieved to the reservoir port T. The same holds true for the control valve 14 since channel 66 is blocked by the control section 108 and the main body 28 is subjected to full fluid pressure via channel 62, annular groove 90 and the throttle bore 96 of the main body 28.

The safety valve according to the present invention will be seen, from the preceding description, to be self-monitoring, i.e. it requires no electrical or electronic monitoring circuits or switches. It operates free of residual fluid pressure due to the fact that whenever a malfunction occurs all communication is blocked between the pump port P and the working-fluid port A.

Furthermore, and independently of the operational positions assumed by the respective control valves 14, 16, one of the main fluid-controlling pistons 20, 22 is always connected to the pump and the other is always connected to the reservoir whenever a malfunction occurs, and the valve can be returned to rest position from this "malfunction position" only by removal of pump pressure at the port P. This means that neither the inventive valve nor a press on which it is installed can be operated until the malfunction has been corrected. Any tolerances in the valve switching times can be compensated by for appropriate throttling of the speed of movement of the respective main fluid-controlling pistons.

The inventive valve as described with reference to the illustrated exemplary embodiment is susceptible of a variety of modifications all of which are intended to be encompassed within the ambit of the appended claims.

For example, the pump port need not be located at the precise position which is shown but could be located elsewhere if more convenient. The same is true of the two channels connecting the working-fluid port with the center bore for the main fluid-controlling pistons and of other specifically illustrated features. What is important is that the functional implementation of the inventive concept be properly embodied in whatever structural modification might be chosen.

Without futher analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and indeed are intended to be comprehended within the meaning and scope of equivalence of the appended claims.

I claim:

1. A valve, particularly a safety valve for a press, comprising: (a) a housing having a bore and a working-fluid port; (b) fluid passage means communicating with said bore and including two connecting channels; and (c) a pair of asymmetrically configurated, fluid-controlling pistons in said bore movable towards and away from one another therein, one of said pistons having a first main body and a first fluid-controlling section and the other of said pistons having a second main body and two axially spaced fluid-controlling sections, said housing having a pump port communicating with said bore in a region intermediate said pistons, and said fluid passage means further including an overflow channel communicating with said bore at opposite sides of said region, said connecting channels connecting said working-fluid port with said bore at opposite sides of said region at locations spaced from said overflow channel.

2. A valve as defined in claim 1, said housing further having a pump port and a reservoir port in communication with said fluid passage means.

3. A valve as defined in claim 2, said pistons being movable in said bore to respective malfunction positions; and wherein said pistons interrupt communication between said working-fluid port and said pump port when a piston is in the respective malfunction position.

4. A valve as defined in claim 2, said pistons being movable in said bore to respective malfunction positions; and wherein one of said pistons communicates with said pump port and the other of said pistons communicates with said reservoir port when a piston is in the respective malfunction position.

5. A valve as defined in claim 4, wherein said one piston is the piston in the respective malfunction position.

6. A valve as defined in claim 1; and further comprising a pair of control valves connected in fluid-exchanging relationship with said fluid passage means.

7. A valve as defined in claim 6, wherein said control valves are electromagnetically actuated valves.

8. A valve as defined in claim 1, wherein one of said pistons has a first main body and a single fluid-controlling section spaced from said first main body, the other of said pistons having a second main body and two axially separated fluid-controlling sections spaced from said second main body.

9. A valve as defined in claim 1, wherein said pistons are in axial alignment with one another.

10. A valve as defined in claim 1, said pistons being movable in said bore to and from respective centered positions; and further comprising lands in said bore cooperating with said fluid-controlling sections, said lands being blocked by said fluid-controlling sections when said pistons are in said centered positions.

11. A valve as defined in claim 1, said housing additionally comprising a reservoir port; and wherein said fluid passage means also includes a pair of annular channels at locations of said bore axially spaced from and at opposite sides of the respective connecting channels, and an overflow passage connecting said annular channels with one another, said reservoir port communicating with one of said annular channels and thereby with said bore.

12. A valve as defined in claim 11; and further comprising means defining a first valve seat in said bore intermediate one of said connecting channels and one of said annular channels, and a second valve seat intermediate said one connecting channel and said region, said first and second valve seats being alternately openable and closable by said first fluid-controlling section of said one piston.

13. A valve as defined in claim 12; and further comprising means defining a third valve seat in said bore intermediate the other of said connecting channels and the other of said annular channels, and a fourth valve seat intermediate said other connecting channel and said region, said third and fourth valve seats being alternately openable and closable by one of said fluid-controlling sections of said other piston.

14. A valve, particularly a safety valve for a press, comprising:
(a) a housing having a bore;
(b) fluid passage means communicating with said bore; and
(c) a pair of asymmetrically configurated, fluid-controlling pistons in said bore movable towards and away from one another therein, one of said pistons having a first main body and a first fluid-controlling section and the other of said pistons having a second main body and two axially spaced fluid-controlling sections, said housing having a pump port, and said bore including a center portion and two axially spaced end portions each of which accommodates one of said main bodies, said fluid passage means comprising a pair of branch channels each connecting said pump port with one of said end portions of said bore.

15. A valve, particularly a safety valve for a press, comprising:
(a) a housing having a bore;
(b) fluid passage means communicating with said bore;
(c) a pair of asymmetrically configurated, fluid-controlling pistons in said bore movable towards and away from one another therein, one of said pistons having a first main body and a first fluid-controlling section and the other of said pistons having a second main body and two axially spaced fluid-controlling sections; and
(d) two control valves mounted on said housing, said main bodies each having an outer circumferential surface formed with a pair of axially spaced annular grooves, and said fluid passage means including fluid-control channels communicating with the respective control valves and cooperating with said annular grooves.

16. A valve as defined in claim 15, said fluid-control channels including first channels for supplying fluid to and second channels for removing fluid from said control valves, said first channels including respective channel portions which cross one another in said housing and connect each control valve with an annular groove of the respective distal one of said main bodies.

17. A valve as defined in claim 15, each of said main bodies having an axially extending blind bore therein, and each main body being formed with a throttle bore connecting the respective blind bore with one of said annular grooves of the respective main body.

18. A valve, particularly a safety valve for a press, comprising:

(a) a housing having a bore;

(b) fluid passage means communicating with said bore;

(c) a pair of asymmetrically configurated, fluid-controlling pistons in said bore movable towards and away from one another therein, one of said pistons having a first main body and a first fluid-controlling section and the other of said pistons having a second main body and two axially spaced fluid-controlling sections; and (d) a pair of centering springs biasing said pistons towards centered positions in said bore.

* * * * *